(12) United States Patent
Yang

(10) Patent No.: US 10,784,487 B2
(45) Date of Patent: *Sep. 22, 2020

(54) INTEGRATED BUSBAR AND BATTERY CONNECTION FOR ELECTRIC VEHICLE BATTERY PACKS

(71) Applicant: Thunder Power New Energy Vehicle Development Company Limited, Central (HK)

(72) Inventor: Yung-Kang Yang, Taichung (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 214 days.

This patent is subject to a terminal disclaimer.

(21) Appl. No.: 15/973,549

(22) Filed: May 8, 2018

(65) Prior Publication Data

US 2018/0331346 A1 Nov. 15, 2018

Related U.S. Application Data

(63) Continuation of application No. 15/187,329, filed on Jun. 20, 2016, now Pat. No. 9,966,586.

(60) Provisional application No. 62/272,713, filed on Dec. 30, 2015.

(51) Int. Cl.
*H01M 2/20* (2006.01)
*H01M 2/10* (2006.01)
*H01M 10/0525* (2010.01)
*H01M 10/058* (2010.01)

(52) U.S. Cl.
CPC ......... *H01M 2/206* (2013.01); *H01M 2/1072* (2013.01); *H01M 2/202* (2013.01); *H01M 10/058* (2013.01); *H01M 10/0525* (2013.01); *H01M 2220/20* (2013.01)

(58) Field of Classification Search
CPC ........... H01M 10/0525; H01M 10/058; H01M 2220/20; H01M 2/1072; H01M 2/202; H01M 2/206
See application file for complete search history.

(56) References Cited

U.S. PATENT DOCUMENTS

2008/0241667 A1* 10/2008 Kohn .................. H01M 2/1016
429/159

* cited by examiner

*Primary Examiner* — Carlos Barcena
(74) *Attorney, Agent, or Firm* — Kilpatrick Townsend & Stockton, LLP

(57) ABSTRACT

A battery pack for an electric vehicle may include a plurality of battery cells arranged into one or more rows. Each of the plurality of battery cells may include a first terminal and a second terminal, and the plurality of battery cells may include a subset of battery cells with the first terminal oriented in a same direction in the battery pack. The battery pack may also include a busbar configured to conduct electrical energy to and from at least the subset of battery cells. The busbar may include a plurality of cutouts positioned over the first terminals of the subset of battery cells, and a plurality of tabs that springably contact the respective first terminal. A method of building a battery pack with a busbar connection is also presented.

20 Claims, 11 Drawing Sheets

INTEGRATED BUSBAR AND BATTERY CONNECTION FOR ELECTRIC VEHICLE BATTERY PACKS

CROSS-REFERENCES TO RELATED APPLICATIONS

The present application is a continuation of U.S. Nonprovisional application Ser. No. 15/187,329, filed Jun. 20, 2016, which is a nonprovisional of and claims priority to U.S. Provisional Application No. 62/272,713, filed Dec. 30, 2015, entitled INTEGRATED BUSBAR AND BATTERY CONNECTION FOR ELECTRIC VEHICLE BATTERY PACKS, which is related to the following commonly assigned patent applications. Each of these applications is incorporated herein by reference:

- U.S. Pat. App. No. 62/727,711, filed Dec. 30, 2015, entitled BATTERY PACKAGING AND INSERT MOLDING FOR ELECTRIC VEHICLES.
- U.S. Pat. App. No. 62/727,712, filed Dec. 30, 2015, entitled BATTERY PACKAGING AND INSERT MOLDING FOR ELECTRIC VEHICLES.
- U.S. Pat. App. No. 62/272,713, filed Dec. 30, 2015, entitled SMART CHARGING SYSTEM FOR ELECTRIC VEHICLE BATTERY PACKS.

BACKGROUND

An electric vehicle uses one or more electric motors powered by electrical energy stored in a rechargeable battery pack. Lithium-based batteries are often chosen for their high power and energy density. In order to ensure that an electric vehicle operates efficiently and safely, the temperature of the battery pack must be maintained within a defined range of optimal temperatures. The coolant system of electric vehicle can be physically extended to the battery pack to remove excess heat, thereby increasing the service life of the battery pack and increasing the distance that can be traveled on a single charge.

As the popularity of electric vehicles increases, efficiency in the manufacturing process will become more important. Processes and devices that decrease the cost of manufacturing battery packs while simultaneously increasing their reliability and safety will be key to meeting customer demands. Specifically, there is a need for processes and devices that ensure reliable electrical connections between individual battery cells, that efficiently cool the battery pack, and that aid in the manufacturing process of assembling the thousands of individual battery cells into modular packs that can be installed and replaced when necessary.

BRIEF SUMMARY

In some embodiments, a battery pack for an electric vehicle may include a plurality of battery cells arranged into one or more rows. Each of the plurality of battery cells may include a first terminal and a second terminal, and the plurality of battery cells may include a subset of battery cells with the first terminal oriented in a same direction in the battery pack. The battery pack may also include a busbar configured to conduct electrical energy to and from at least the subset of battery cells. The busbar may include a plurality of cutouts positioned over the first terminals of the subset of battery cells, and a plurality of tabs that springably contact the respective first terminal.

In some embodiments, a method of manufacturing a battery pack for an electric vehicle, may include arranging a plurality of battery cells into one or more rows. Each of the plurality of battery cells may include a first terminal and a second terminal, and the plurality of battery cells may include a subset of battery cells with the first terminal oriented in a same direction in the battery pack. The method may also include positioning a busbar configured to conduct electrical energy to and from at least the subset of battery cells. The busbar may include a plurality of cutouts positioned over the first terminals of the subset of battery cells, and a plurality of tabs that springably contact the respective first terminals of the subset of battery cells.

In various embodiments, one or more of the following features may be included in any combination and without limitation. Each of the plurality of tabs may be less than 1.0 mm thick. The busbar may include a metal sheet. The plurality of cutouts may be arranged into one or more rows. The plurality of cutouts may be formed by punching holes with a tab in a metal sheet. The plurality of cutouts may further be formed by thinning the tab. The plurality of cutouts may further be formed by bending the thinned tab into a springable profile. The busbar may be positioned on a bottom plane of the battery pack. The busbar may be more than 1.00 mm thick. The battery pack may further include a second busbar positioned on a top plane of the battery pack and in contact with the second terminal of the subset of battery cells.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for providing an integrated busbar and connection apparatus that eliminates solder connections between the busbar and the terminals of the individual battery cells in a battery pack. In some battery packs, a subset of the battery cells may all be oriented in the same direction such that the positive/negative terminals are all exposed on the same side of the battery pack (e.g., the bottom of the battery pack). A busbar can be formed by removing a series of cutouts that are aligned with the individual battery cells. Each cutout can include a tab that is thinned and then formed into a springable flange that contacts the terminals of the battery cells. In some embodiments, the busbar can be placed in an injection mold, the battery cells placed thereon, and in molded insert injected to form a solid battery pack.

Figure 1:
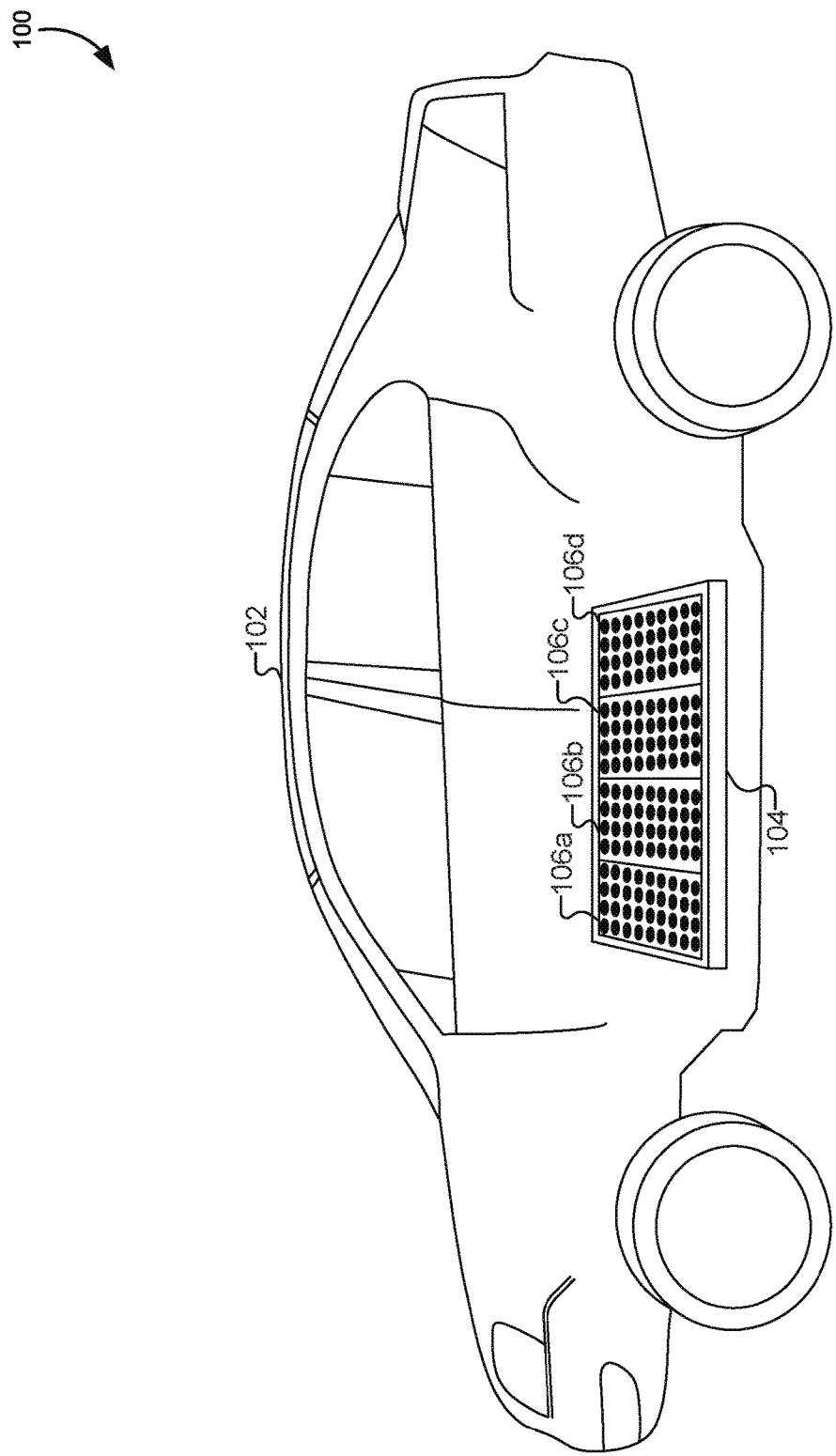
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery packs 106a, 106b, 106c, 106d. A battery pack may be comprised of a plurality of individual battery cells that are electrically connected to provide a particular voltage/current to the electric vehicle 102. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form a single battery pack 106a, and the rechargeable battery system 104 may include four battery packs 106, eight battery packs, ten battery packs, sixteen battery packs, and/or the like, connected in parallel or series until the electrical requirements of the electric vehicle 102 are satisfied. The individual battery cells included in each battery pack 106 may total in the thousands for a single electric vehicle 102.

Figure 2:
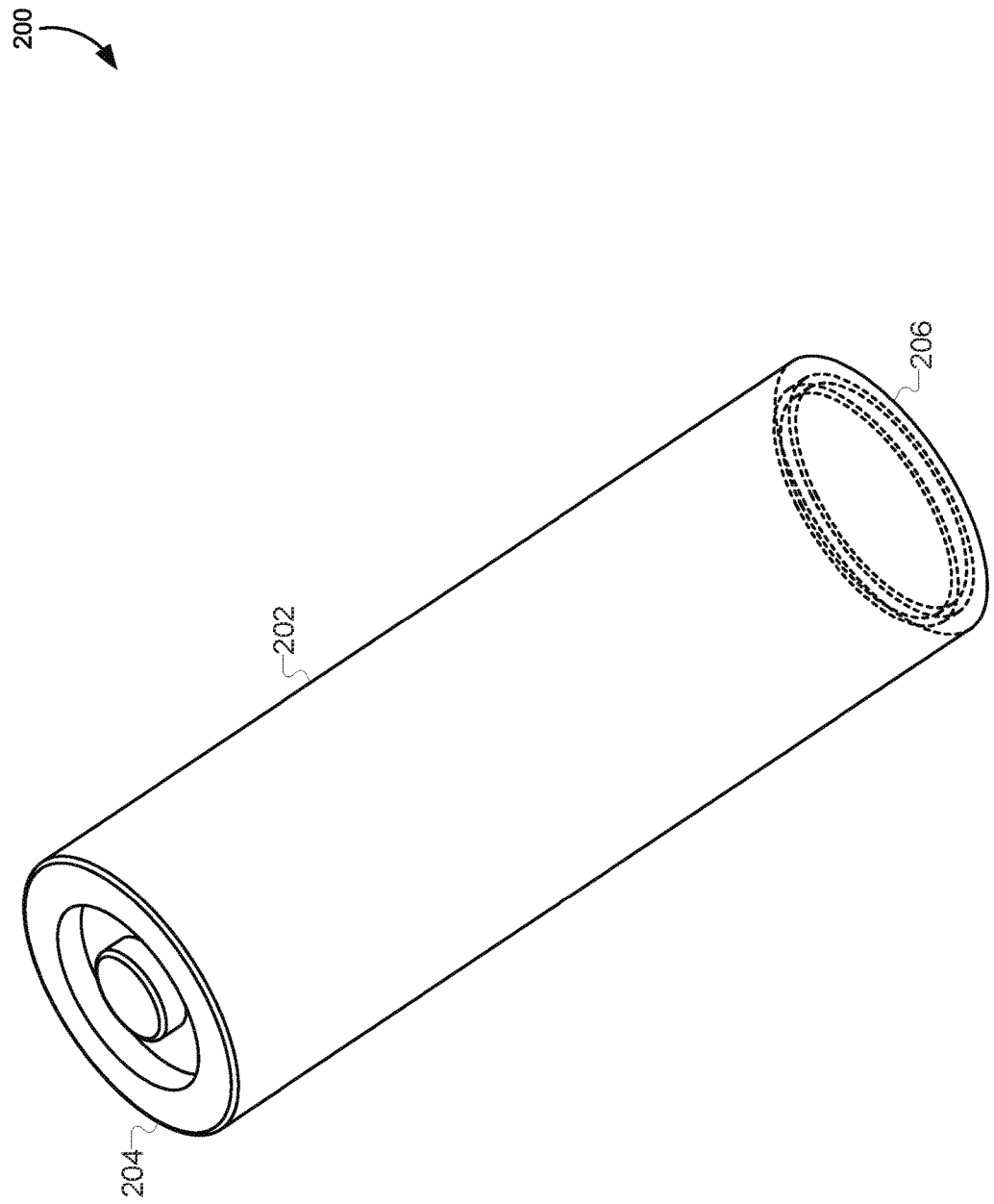
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g. The battery 202 may have at least two terminals. In some embodiments, a positive terminal 204 may be located at the top of the battery 202, and a negative terminal 206 may be located on the opposite bottom side of the battery 202.

Figure 3:
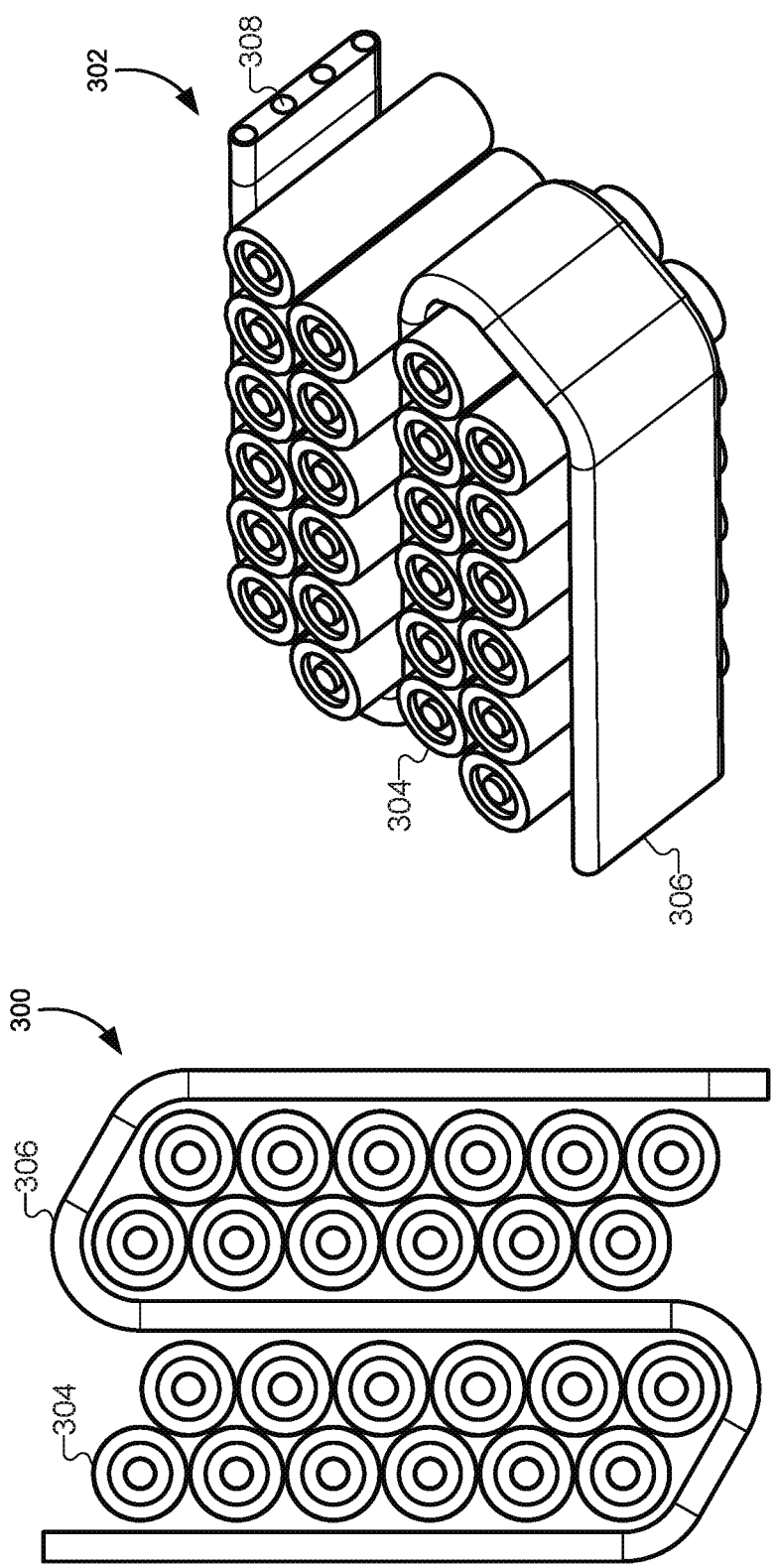
FIG. 3 illustrates a top view and an isometric view of a battery pack with a coolant loop, according to some embodiments.

FIG. 3 illustrates a top view 300 and an isometric view 302 of a battery pack 304 with a coolant loop 306, according to some embodiments. The battery pack 304 depicted in FIG. 3 is greatly simplified from an actual battery pack that would be used in electric vehicle. The number of individual battery cells and cell rows has been greatly reduced in order to describe the elements of the present invention simply and clearly. It will be understood that actual battery packs would include many more individual battery cells and more complicated routing of the coolant loop 306.

The individual battery cells in the battery pack 304 are linearly arranged in a series of rows, with each individual battery cell being adjacent to another battery cell within the row. In some embodiments, there will be no appreciable gap between the individual battery cells within a single row. In order to maximize the number of individual battery cells per unit volume, adjacent rows of battery cells are offset by approximately the radius of one individual battery cell. Adjacent rows are then placed next to each other in the offset position depicted in FIG. 3 such that each individual battery cell in a first row is adjacent to or contacting two individual battery cells in a second row. In some embodiments (not shown) three or more rows are placed adjacent to each other with no appreciable gaps therebetween.

The battery pack 304 of FIG. 3 includes pairs adjacent rows separated by a coolant loop 306. The electric vehicle may be configured to pump liquid coolant through the coolant loop 306 in order to transfer heat from the battery pack 304 to a radiator or other heat exchange system. The coolant loop 306 may include one or more coolant tubes 308 through which liquid coolant may be circulated. In some embodiments, the electric vehicle may use a dedicated coolant loop for the battery pack 304, while other embodiments may utilize an existing engine coolant system. In some embodiments, the coolant loop 306 may also be coupled to a heating system, such that the battery pack 304 can be heated when extreme weather causes the ambient temperature to drop below a preferred operating temperature range of the individual battery cells.

Figure 4:
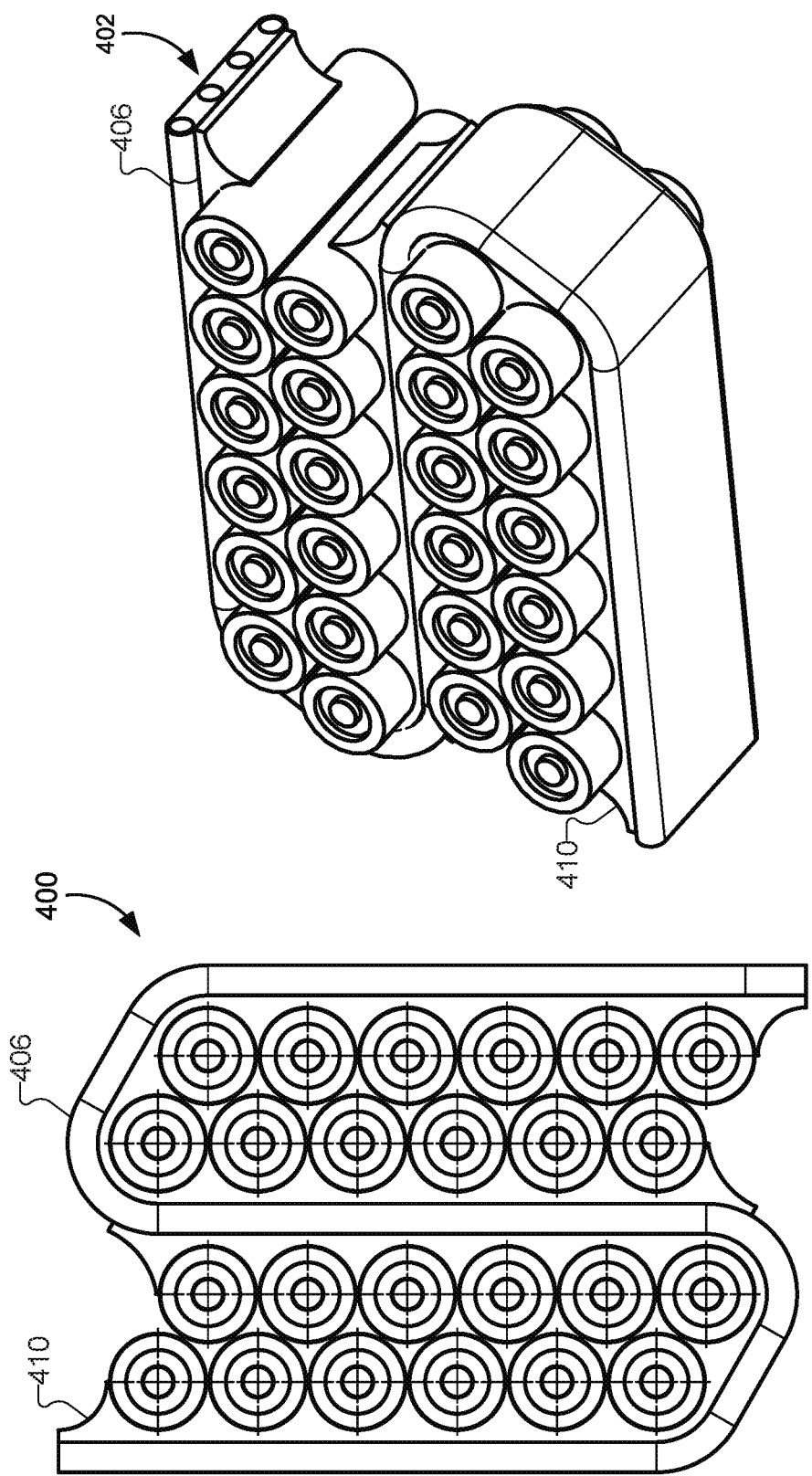
FIG. 4 illustrates a top view and an isometric view of a battery pack with a coolant loop with a thermal pad that is shaped to conform to the battery cells.

FIG. 4 illustrates a coolant loop 406 with a thermal pad 410 that is shaped to conform to the battery cells. In this embodiment, the coolant loop 406 is allowed to remain straight, and the thermal interface between the coolant loop 406 and individual battery cells is formed through the use of a thermal pad 410. The thermal pad may comprise a first side that is substantially flat and conforms to the vertical profile of the coolant loop 406. The thermal pad 410 may be bonded to the coolant loop 406 using epoxies, adhesives, tape, and/or the like. In some embodiments, the thermal pad 410 may be manufactured in the form of the sleeve with an interior surface that conforms to the shape of the coolant loop 406. The coolant loop 406 may be inserted into the thermal pad 410 such that the internal surface of the thermal pad 410 is in contact with the coolant loop 406. The thermal pad 410 may be formed from a material with at least some elastic properties, thereby causing the thermal pad 410 to remain in close contact with the coolant loop 406.

In the example of FIG. 4, each of the individual battery cells is oriented in a same direction. In other words, the positive terminal of each of the individual battery cells faces in an upward direction relative to the battery pack, and each of the negative terminals faces in a downward direction. In other embodiments, this need not be the case. Alternating rows of individual battery cells may be oriented in opposite direction such that the positive terminal of a first row is oriented in the up direction and the positive terminal of a second row is oriented in the downward direction. The orientation pattern for individual battery cells may vary without limitation. For example, every other battery cell in a row be oriented in opposite directions. In some embodiments, one half of the battery pack may have battery cells oriented in one direction, while the other half of the battery pack has cells oriented in the opposite direction. In any of these cases, connections may need to be established between batteries oriented in opposite directions or between batteries oriented in the same direction.

In order to make electrical connections between battery cells, a busbar may be used. As used herein, the term "busbar" refers to any metallic conductor that is connected to a plurality of individual battery cell terminals in order to transmit power from the individual battery cells to the electrical system of the electric vehicle. In some embodiments, the busbar may comprise a flat metallic sheet that is positioned on the top or the bottom of the battery pack. In some embodiments, the metallic sheet may cover an entire top or bottom of the battery pack, while in other embodiments, the busbar may comprise a strip that is longer than it is wide to interface with a single row of battery cells.

Prior to this disclosure, electrical connections between a busbar and an individual battery cell was achieved by soldering a wire from the terminal of the battery to the busbar. In the embodiments described herein, a busbar with an integrated connection tab is presented. In a location where the busbar interfaces with an individual battery cell, a cutout is formed. The cutout may include a center tab that can be thinned and formed into a springable component that is configured to maintain contact with the terminal of a battery cell.

Figure 5:
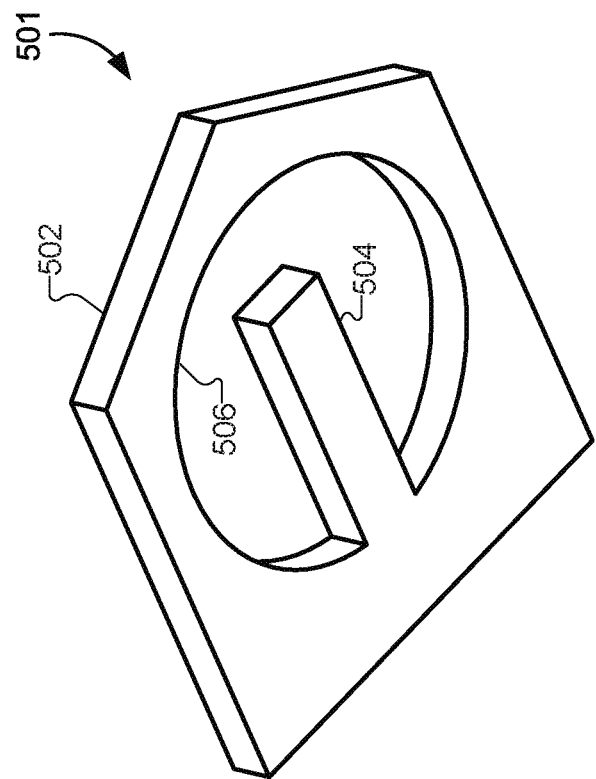
FIG. 5 illustrates a top view and an isometric view of a section of a busbar with a stamped circular section with a center tab, according to some embodiments.
Figure 5:
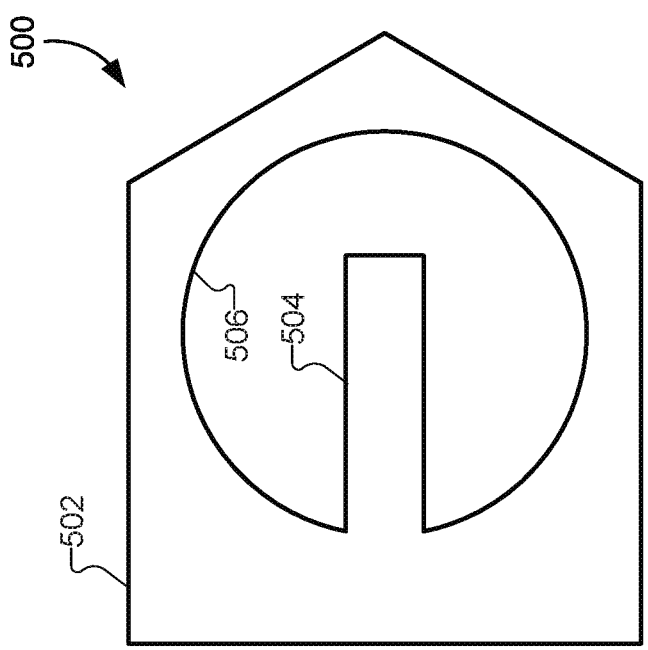

FIG. 5 illustrates a top view 500 and an isometric view 501 of a section 502 of a busbar with a stamped circular section 506 with a center tab 504, according to some embodiments. This section 502 of a busbar is simplified for the sake of providing a detailed explanation. Although omitted from this figure, the outside shape of the section 502 of the busbar may extend in each direction to form a metal sheet. The section of the busbar may be formed from any metallic or conductive material, such as aluminum. The section 502 of the busbar includes the stamped circular section 506 with a center tab 504 that may be formed by pressing a cutter into a metal sheet. In some embodiments, the thickness of the busbar may be between 1.0 mm and 5.0 mm. In one embodiment, the thickness of the busbar is 1.5 mm. Because the stamped circular section 506 with the center tab 504 is initially cut from a solid sheet of metal, the center tab 504 will initially be the same thickness as the rest of the section 502 of the busbar. The shape of the circular section 506 is merely exemplary and not meant to be limiting. Other embodiments may use cutouts of varying shapes, such as rectangular cutouts, oval cutouts, and/or the like. These varying shapes may be cut out on a machine press, or may be machined away on a CNC machine.

Figure 6:
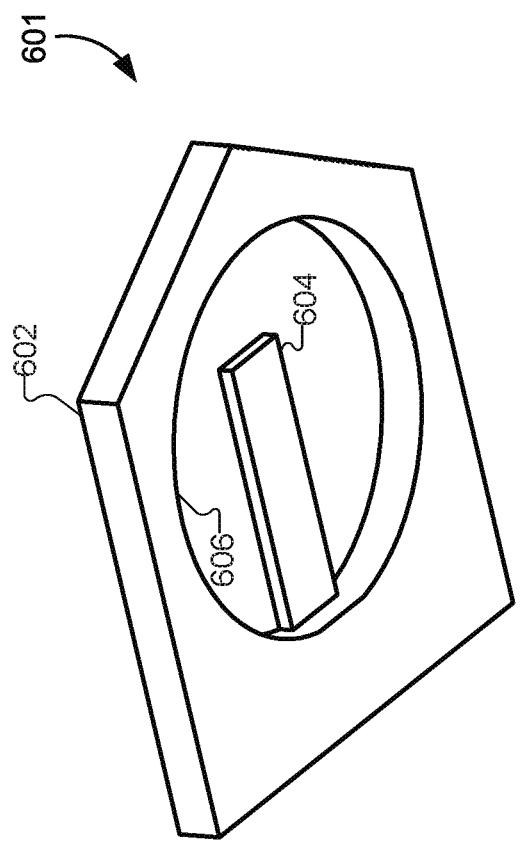
FIG. 6 illustrates a side view and an isometric view of a section of a busbar with a thinned center tab, according to some embodiments.
Figure 6:
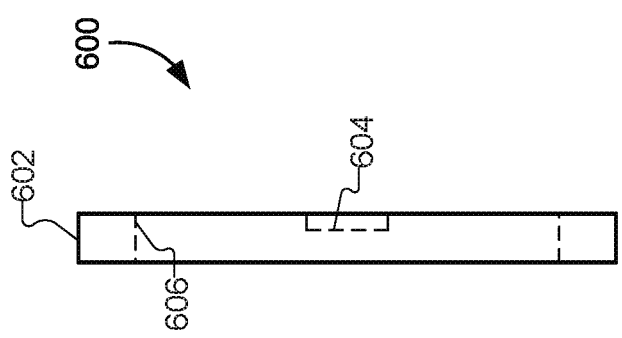

FIG. 6 illustrates a side view 600 and an isometric view 601 of a section 602 of a busbar with a thinned center tab 604, according to some embodiments. The center tab 504 of FIG. 5 may be formed into a springable component that can be configured to press against the terminal of the battery cell. In some embodiments, the center tab 504 of FIG. 5 may simply be bent in a direction of the battery terminal in order to make contact in a springable fashion. In other embodiments, the center tab may be thinned and formed into a shape that provides greater flexibility than the center tab of the same thickness of the metal sheet. FIG. 6 illustrates a thinned center tab 604 that may be bent and shaped more readily than a center tab of greater thickness.

The thinned center tab 604 may be machined away from the rest of the section 602 of the busbar within the cutout 606. In embodiments where the cutout 606 is machined using a CNC machine, the thinned center tab 604 may also be machined to a desired thickness. In some embodiments, the thinned center tab 604 may be between 0.1 mm and 1.0 mm. In one embodiment, the thinned center tab 604 is approximately 0.3 mm thick. In some embodiments, the thinned the center tab 604 may be recessed away from the plane of the busbar on one side, while remaining flush with the plane of the busbar on the other side. This allows the busbar to be machined on a single side without requiring the busbar to be turned over during the machining process. The thinned center tab 604 may be flush with the plane of the busbar on the side opposite of the side on which the individual battery cells will be positioned.

Figure 7:
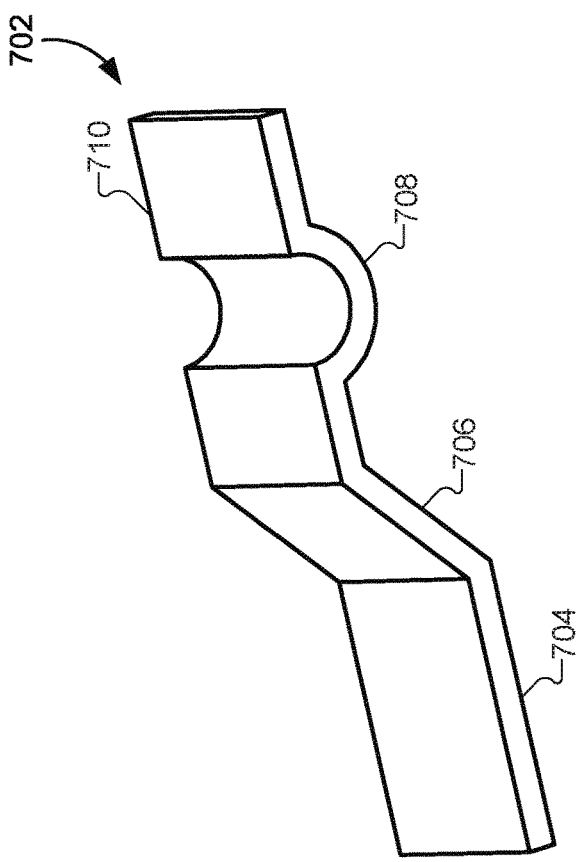
FIG. 7 illustrates a side view and an isometric view of a thinned center tab shaped to springably contact a battery cell terminal, according to some embodiments.
Figure 7:
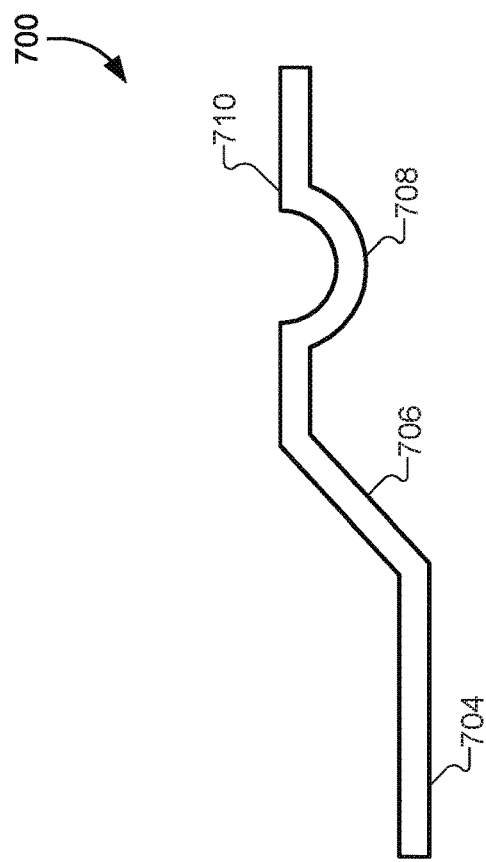

FIG. 7 illustrates a side view 700 and an isometric view 702 of a thinned center tab shaped to springably contact a battery cell terminal, according to some embodiments. The profile of the thinned center tab 704 of FIG. 7 is merely exemplary and not meant to be limiting. One having skill in the art would be able to form many different profiles that would have a spreadable characteristic and be flexible enough to make contact with the individual battery cell terminals.

In this embodiment, the thinned center tab includes a straight section 704 followed by an angled section 706 that is of a length sufficient to bring the thinned center tab in contact with the battery terminal on the opposite side of the busbar. The thinned center tab next may include a straight section that provides a mating surface 710 between the busbar and the battery terminal. In some embodiments, the mating surface 710 may include a mechanical relief, such as the circular section 708 illustrated by FIG. 7. Different shapes may be used in other embodiments, so long as they bring the thinned center tab 704 in contact with the battery terminal, and provide a sufficient spring force to maintain contact between the mating surface 710 and the battery terminal.

Figure 8:
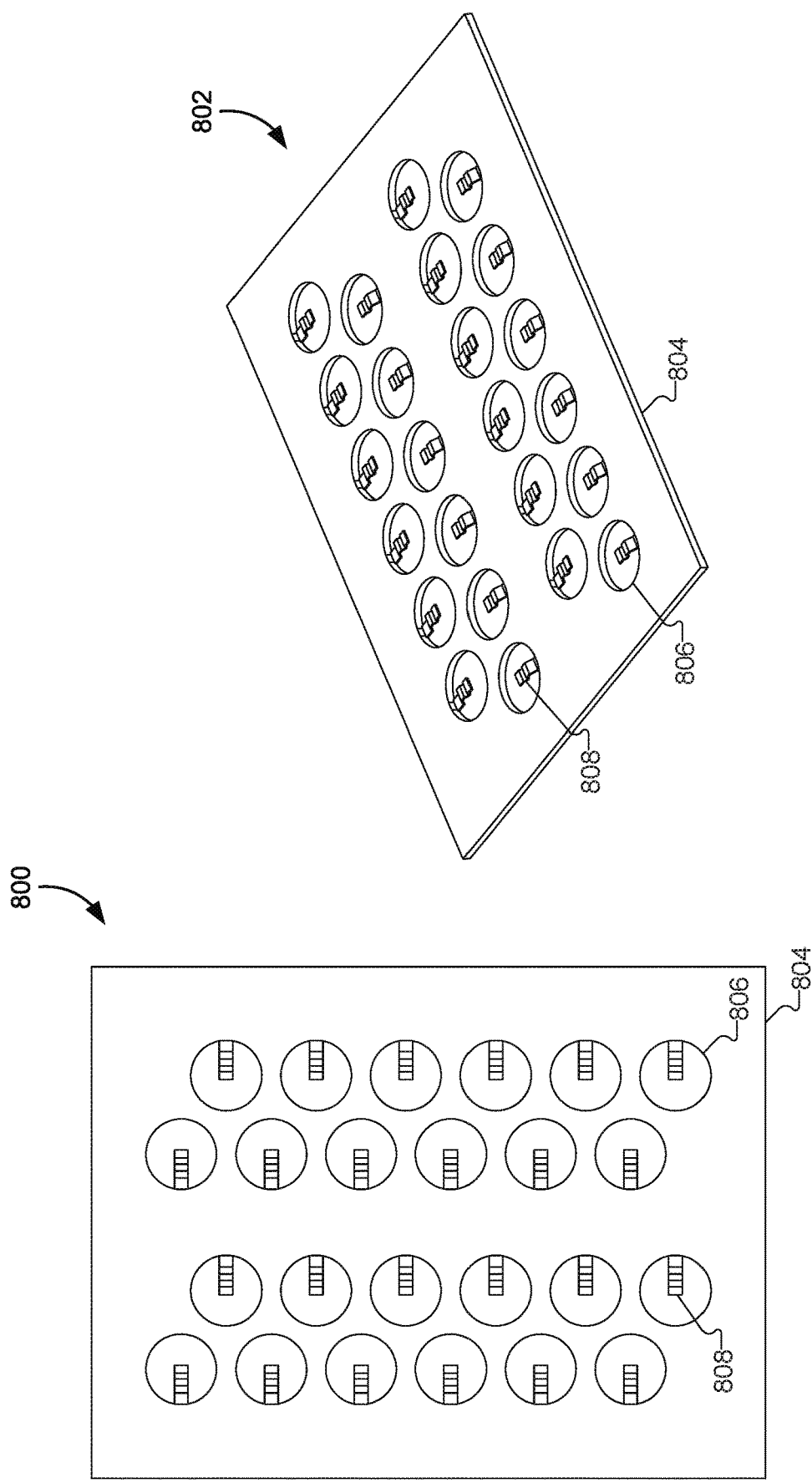
FIG. 8 illustrates a busbar with a series of cutouts for battery cells arranged in a plurality of rows, according to some embodiments.

FIG. 8 illustrates a top view 800 and an isometric view 802 of a busbar with a series of cutouts 806 for battery cells arranged in a plurality of rows, according to some embodiments. While the previous figures have focused on a single cutout with a single center tab for simplicity, the views 800, 802 of FIG. 8 illustrates how the busbar 804 may tend to appear in real-world applications. In this embodiment, each of the individual battery cells in the section covered by the busbar 804 are oriented in the same direction. For example, a negative terminal of each of the individual battery cells may be oriented perpendicular to the plane of the busbar 804. Each of the individual battery cells may be positioned so as to be centered over each of the cutouts 806. Each of the cutouts 806 includes a center tab 808 that will make springable contact with the negative terminal of the individual battery cells.

Figure 9:
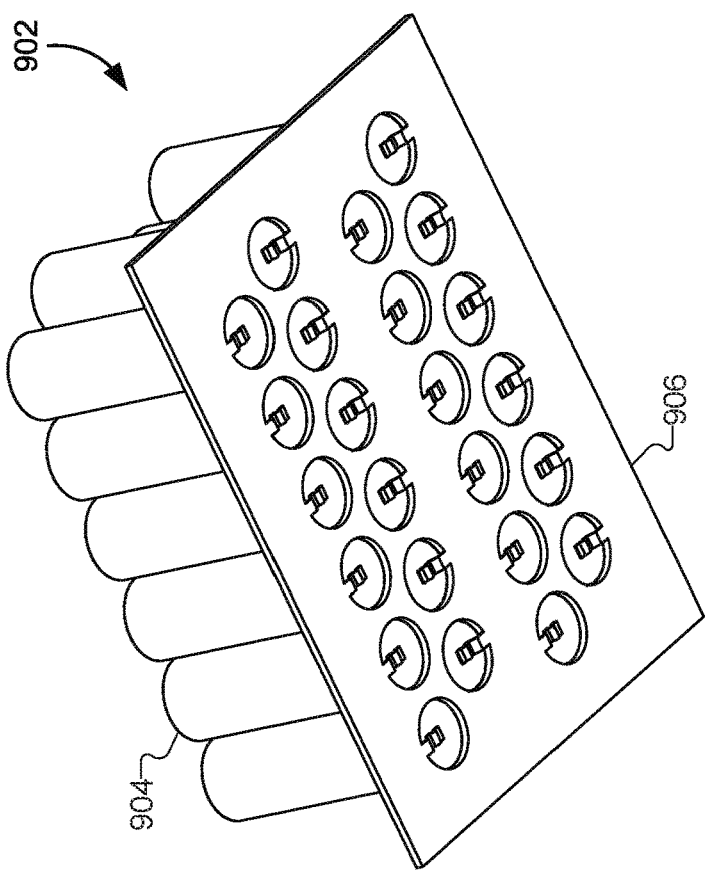
FIG. 9 illustrates a busbar aligned with a plurality of battery cells arranged in a plurality of rows, according to some embodiments.
Figure 9:
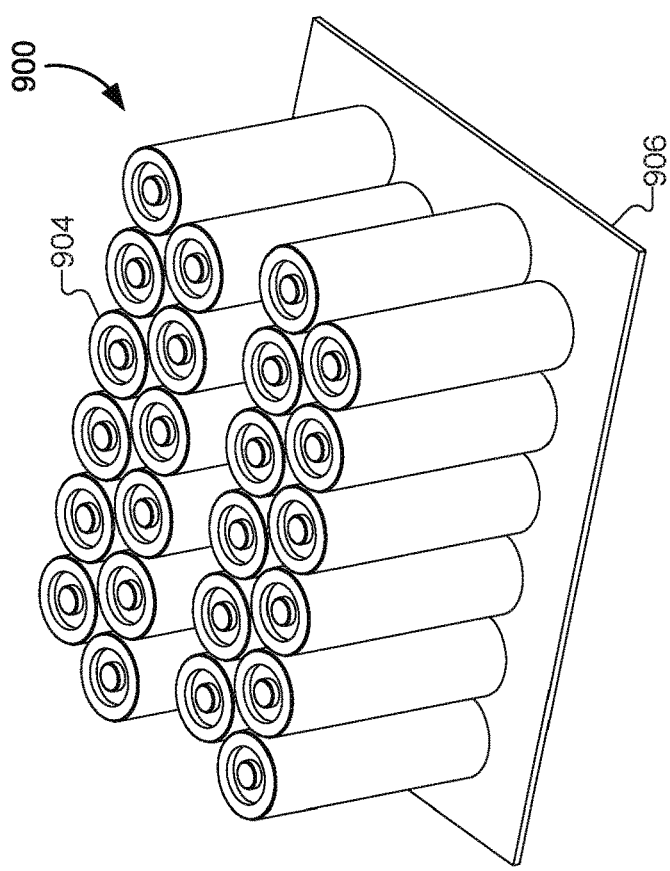

FIG. 9 illustrates a top isomatic view 900 and a bottom isometric view 902 of a busbar 906 aligned with a plurality of battery cells 904 arranged in a plurality of rows, according to some embodiments. The plurality of battery cells 904 is arranged in sets of adjacent rows as illustrated above in FIG. 3, leaving space for a coolant loop to run between each of the adjacent pairs of rows of individual battery cells. The cutout sections of the busbar may include a recessed portion that allows the individual battery cells to be placed within a portion of the cutout. In these embodiments, the busbar 906 may be used as a template for placing the individual battery cells so that they are uniform in each battery pack manufactured. The busbar 906 may also hold the individual battery cells in place during the manufacturing process such that the coolant loop can be routed through the battery pack and any thermal padding or injection-molded inserts can be added without causing the individual battery cells to shift out of position. As illustrated by view 902, the center tabs of each cutout will make springable contact with the underside of each of the individual battery terminals without requiring any soldering or other type of mechanical connection.

Figure 10:
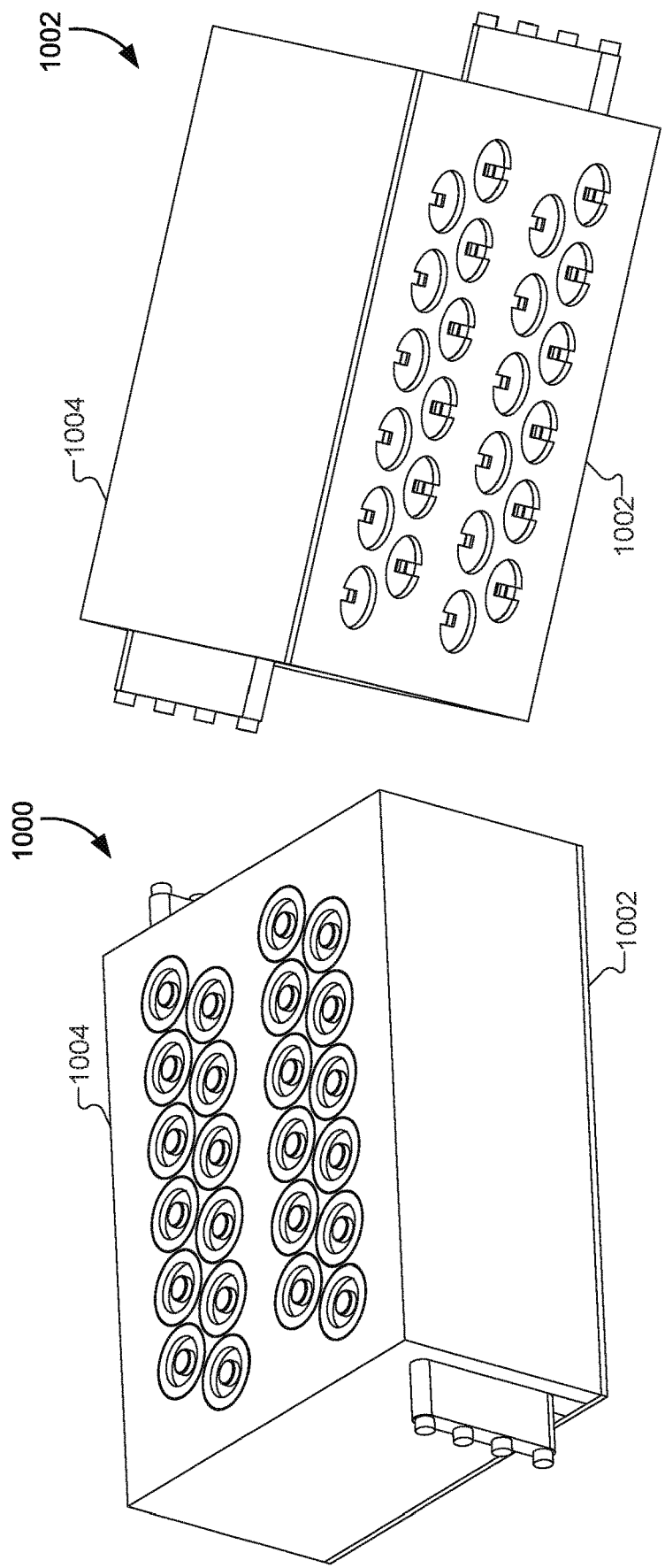
FIG. 10 illustrates a busbar mated with a battery pack with a molded insert, according to some embodiments.

FIG. 10 illustrates a top isomatic view 1000 and a bottom isometric view 1002 of a busbar 1002 mated with a battery pack with a molded insert 1004, according to some embodiments. A molded insert 1004 can be injected into an injection mold and allowed to flow around and through any cavities between the individual battery cells and any components related to the coolant loop. In this embodiment, the molded insert 1004 is applied such that it is level with the top of the individual battery cells. The molded insert 1004 fully covers the coolant loop and the thermal pad. However, the molded insert 1004 does not cover the tops of individual battery cells or the bottoms of the individual battery cells. Instead, these areas of the individual battery cells are left exposed such that electrical connections can be made between individual battery cells after the molded insert is applied. In other embodiments (not shown), the molded insert 1004 does not extend all the way to the top and/or bottom terminals of the battery pack. In some embodiments, the exposed portion of the individual battery cells may be between 1.0 mm and 15.0 mm. The amount of each individual battery cell exposed may differ between the top and bottom portions of the individual battery cells. By leaving a portion of the individual battery cells exposed, some types of electrical connections to the individual battery cells may be more easily applied.

In some embodiments, the injection mold used to apply the molded insert 1004 may include room for the busbar 1002. In these embodiments, the busbar 1002 can be placed within the injection mold. The individual battery cells can then be added to the cutouts of the busbar 1002, and the coolant loop can be routed between the rows of individual battery cells and through exit holes in the injection mold. In some embodiments may include a second busbar that may be added to the top of the battery pack to connect the positive terminals of the individual battery cells. Note that the second busbar is not shown in FIG. 10 in order to clearly depict the locations of the individual battery cells relative to the bottom busbar 1002. A combination of plastics and/or epoxies can be then injected into the injection mold and a solid battery pack can be formed. In some embodiments, the busbar 1002 may be secured to the bottom of the battery pack by the molded insert or by other mechanical means, such as screws and/or adhesives.

Although FIG. 10 illustrates a busbar 1002 that is a continuous plane that contacts every battery in the depicted section of the battery pack, other embodiments need not be so limited. As described above, the busbar 1002 may be comprised of individual strips of metal that cover single rows of battery cells. For example, each of the rows of battery cells in FIG. 10 may be oriented in opposite directions, which may require two or more busbar scripts.

Figure 11:
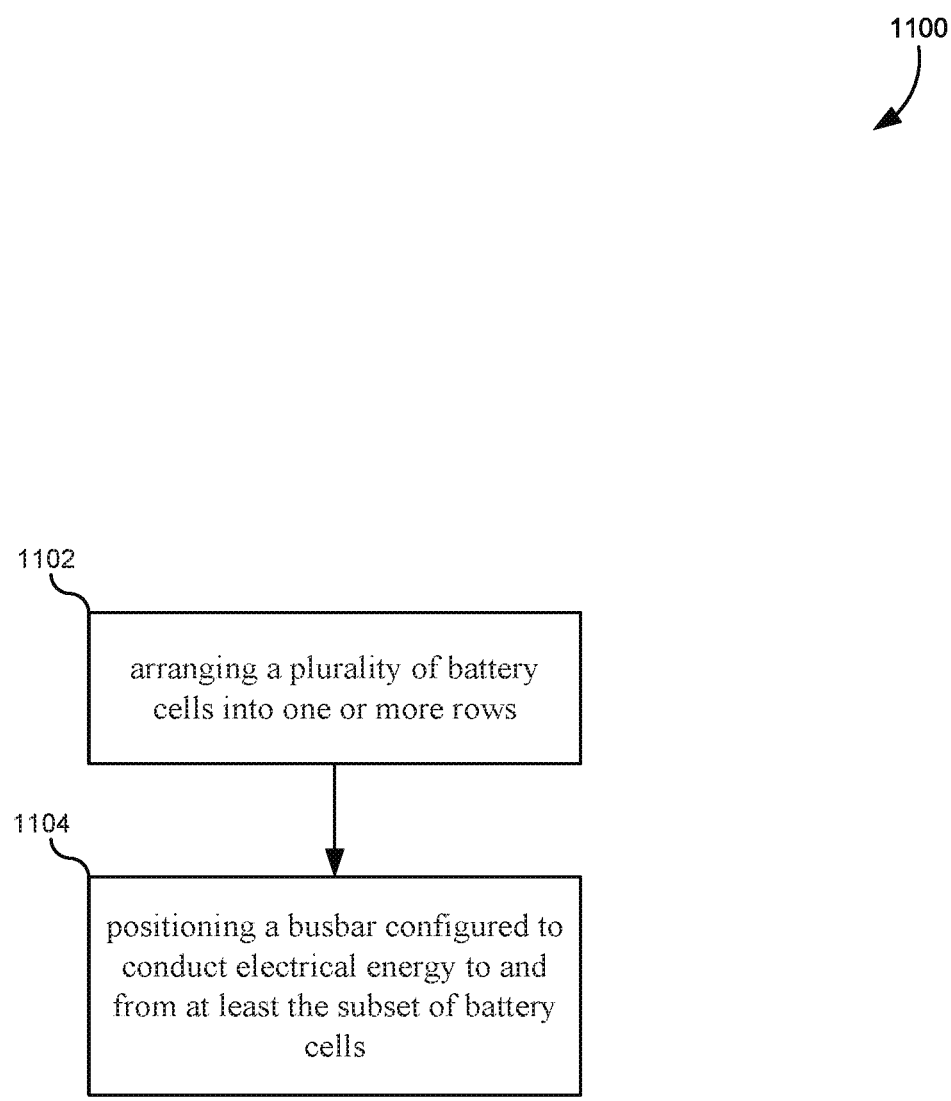
FIG. 11 illustrates a flowchart of a method of manufacturing a battery pack with a busbar, according to some embodiments.

FIG. 11 illustrates a flowchart of a method of manufacturing a battery pack with a busbar, according to some embodiments. The method may include arranging a plurality of battery cells into one or more rows (1102). Each of the plurality of battery cells may include a first terminal and the second terminal. For example, each cell may include a positive terminal and a negative terminal oriented on opposite sides of each of the individual battery cells. The plurality of battery cells may include a subset of battery cells with the first terminal oriented in the same direction battery pack. For example, a row of battery cells in the battery pack may form the recited subset of batteries. Each battery in that row may be oriented such that the positive terminal faces up relative to the battery pack, and the negative terminal faces down relative to the battery pack.

The method may also include positioning a busbar configured to conduct electrical energy to and from at least the subset of battery cells (1104). In some embodiments, the busbar may include a plurality of cutouts positioned over the first terminals of the subset of battery cells. As illustrated above, the cutouts may include recesses into which the individual battery cells may be seated such that the battery cells are centered over the cutout. In some embodiments, the busbar may include a plurality of tabs that springably contact each of the subset of the battery cells.

It should be appreciated that the specific steps illustrated in FIG. 11 provide particular methods of providing a busbar for a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A busbar for a battery pack in an electric vehicle, the busbar comprising:
    a sheet of conductive material having a first thickness configured to conduct electrical energy between a plurality of same terminals on a plurality of battery cells;
    a plurality of circular cutouts having diameters that are sized to accept at least a portion of the terminals of the plurality of battery cells inside the plurality of circular cutouts; and
    a plurality of tabs having a second thickness configured to springably contact the terminals of the plurality of battery cells, wherein the second thickness is less than the first thickness.

2. The busbar of claim 1, wherein each of the plurality of tabs comprises a straight section coupled to an angled section that is of a length sufficient to bring the tab into contact with a battery terminal.

3. The busbar of claim 2, wherein each of the angled sections is further coupled to a second straight section that provides a mating surface between the busbar and the battery terminal.

4. The busbar of claim 3, wherein the second straight section comprises a mechanical relief.

5. The busbar of claim 4, wherein the mechanical relief comprises a semi-circular section.

6. The busbar of claim 5, wherein the semi-circular section is further coupled to a third straight section.

7. The busbar of claim 1, wherein each of the plurality of tabs are less than 1.0 mm thick.

8. The busbar of claim 1, wherein the plurality of circular cutouts are arranged into one or more rows.

9. The busbar of claim 1, wherein the plurality of circular cutouts are formed by punching holes with a tab in a metal sheet.

10. The busbar of claim 1, wherein the busbar is more than 1.00 mm thick.

11. A method of manufacturing a battery pack for an electric vehicle, the method comprising:
    arranging a plurality of battery cells into one or more rows; and
    positioning a busbar configured to conduct electrical energy to and from at least the subset of battery cells, the busbar comprising:
    a sheet of conductive material having a first thickness configured to conduct electrical energy between a plurality of same terminals on the plurality of battery cells;
    a plurality of circular cutouts having diameters that are sized to accept at least a portion of the terminals of the plurality of battery cells inside the plurality of circular cutouts; and
    a plurality of tabs having a second thickness configured to springably contact the terminals of the plurality of battery cells, wherein the second thickness is less than the first thickness.

12. The method of claim 11, wherein each of the plurality of tabs comprises a straight section coupled to an angled section that is of a length sufficient to bring the tab into contact with a battery terminal.

13. The method of claim 12, wherein each of the angled sections is further coupled to a second straight section that provides a mating surface between the busbar and the battery terminal.

14. The method of claim 13, wherein the second straight section comprises a mechanical relief.

15. The method of claim 14, wherein the mechanical relief comprises a semi-circular section.

16. The method of claim 15, wherein the semi-circular section is further coupled to a third straight section.

17. The method of claim 11, wherein each of the plurality of tabs are less than 1.0 mm thick.

18. The method of claim 11, wherein the plurality of circular cutouts are arranged into one or more rows.

19. The method of claim 11, wherein the plurality of circular cutouts are formed by punching holes with a tab in a metal sheet.

20. The method of claim 11, wherein the busbar is more than 1.00 mm thick.

* * * * *